US006843970B1

(12) United States Patent
Hard

(10) Patent No.: US 6,843,970 B1
(45) Date of Patent: Jan. 18, 2005

(54) PROCESS FOR RECOVERING METAL VALUES BY DISSOLVING THEM IN A SULFURIC ACID SOLUTION CONTAINING A CARBON SOURCE AND A REDUCING AGENT

(75) Inventor: Robert A. Hard, Hollowell, ME (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 08/623,852

(22) Filed: Mar. 26, 1996

(51) Int. Cl.$^7$ .............................................. C22B 34/00
(52) U.S. Cl. ............................. 423/68; 423/18; 423/41; 423/98
(58) Field of Search .............................. 423/68, 98, 41, 423/18, 20

(56) References Cited

U.S. PATENT DOCUMENTS

| | | | |
|---|---|---|---|
| 2,767,047 A | 10/1956 | Wilhelm et al. ................ 23/23 |
| 2,953,453 A | * 9/1960 | Foos ........................... 423/67 |
| 2,962,372 A | 11/1960 | Foos et al. ..................... 75/121 |
| 3,117,833 A | 1/1964 | Pierret ........................... 23/19 |
| 3,300,297 A | 1/1967 | Field .............................. 75/24 |
| 3,658,511 A | 4/1972 | Gustison |
| 3,712,939 A | 1/1973 | Capps et al. |
| 3,972,710 A | 8/1976 | Meyer |
| 4,155,982 A | 5/1979 | Hunkin et al. |
| 4,164,417 A | 8/1979 | Gustison |
| 4,233,278 A | 11/1980 | Korchnak |
| 4,234,555 A | 11/1980 | Pulley et al. |
| 4,278,640 A | 7/1981 | Allen et al. |
| 4,293,528 A | 10/1981 | Paul |
| 4,302,243 A | * 11/1981 | Tamaru et al. ................. 423/68 |
| 4,309,389 A | 1/1982 | Meyer |
| 4,320,093 A | 3/1982 | Volesky et al. |
| 4,332,777 A | * 6/1982 | Pazdej ......................... 423/98 |
| 4,412,861 A | 11/1983 | Kreuzmann |
| 4,446,115 A | 5/1984 | Endo et al. |
| 4,446,116 A | 5/1984 | Krismer et al. |
| 4,451,438 A | 5/1984 | Floeter et al. |
| 4,477,416 A | 10/1984 | Goddard |
| 4,536,034 A | 8/1985 | Otto, Jr. et al. |
| 4,654,200 A | 3/1987 | Nirdosh et al. |
| 4,663,130 A | 5/1987 | Bergman et al. |
| 4,673,554 A | 6/1987 | Niwa et al. |
| 4,695,290 A | 9/1987 | Kindig et al. |
| 4,718,996 A | 1/1988 | Vanderpool et al. |
| 4,743,271 A | 5/1988 | Kindig et al. |
| 4,753,033 A | 6/1988 | Kindig |
| 4,778,663 A | 10/1988 | Rickelton |
| 4,808,384 A | 2/1989 | Vanderpool et al. |
| 4,923,507 A | 5/1990 | Silva, Filho |
| 5,023,059 A | 6/1991 | Bielecki et al. |
| 5,084,253 A | 1/1992 | Pollock et al. |
| 5,209,910 A | 5/1993 | Bludssus et al. |
| 5,232,490 A | * 8/1993 | Bender et al. ................. 423/41 |
| 5,273,725 A | 12/1993 | Carlson |
| 5,384,105 A | 1/1995 | Carlson |
| 5,437,848 A | 8/1995 | Hard |
| 5,492,680 A | 2/1996 | Odekirk |

FOREIGN PATENT DOCUMENTS

| | | | |
|---|---|---|---|
| CA | 770058 | * 10/1967 | .................. 423/68 |
| EP | 0 041 459 | 6/1981 | |
| FR | 2 438 623 | 1/1980 | |

OTHER PUBLICATIONS

Solvent Extraction Principles and Applications to Process Metallurgy, Part II., no date.
Radioactive Waste Disposal in the Shiprock–Type Uranium Milling Flowsheet by K.E. Tame, E.G. Valdez, and J.B. Rosenbaum, no date.
Radium Removal from Uranium Ores and Mill Tailings by S.R. Borrowman and P.T. Brooks, no date.
The Purification of Inorganic Acids by the Amine Liquid Ion Exchange Process by D.W. Agers, J.E. House, J.L. Drobnick and C.J. Lewis, no date.
Scandium Recovery From a Tantalum Waste Residue: A Status Report by D.D. Harbuck and G.R. Palmer, U.S. Bureau of Mines, 1991, no month.
Evaluation of Scandium Oxide Production from Tantalum Processing Waste, Aug., 1993, edited by G. Kyle Green.
*Scandium Saves Aluminum*, Rare–earth Information Center Insight, Ames Laboratory Institute for Physical Research and Technology, vol. 6, No. 4, Apr. 1, 1993.
*Co–extraction of uranium and thorium*, by G.M. Ritcey and B.H. Lucas, Apr., 1972, Journal of Metals, pp. 39–44.
PCT Application No. WO 90/02823, published Mar. 22, 1990.
PCT Application No. WO 95/13985, published May 26, 1995.
PCT Int'l Appln. No. PCT/US97/04013 Search Report mailed Jul. 16, 1997.
PCT Application No. WO/94/01190, published Jan. 20, 1994.
PCT Int'l Appln. No. PCT/US97/04089 Search Report mailed Aug. 12, 1997.
PCT Int'l Appln. No. PCT/US97/04088 Search Report mailed Aug. 5, 1997.
"Extractive metallurgy of niobium, tantalum, and vanadium," by C.K. Gupta, pp. 405–444, 1984, no month, International metals Reviews, vol. 29(6).

* cited by examiner

*Primary Examiner*—Steven Bos

(57) ABSTRACT

A process for recovering metal values from a metal containing material including the metal values comprising digesting the metal containing material in a sulfuric acid solution comprising sulfuric acid, a reducing agent, and a carbon source, heating the digestion mixture and separating the resulting solution from the remaining solids. The sulfuric acid solution may additionally include hydrofluoric acid (HF) as a source of fluoride ion.

16 Claims, No Drawings

PROCESS FOR RECOVERING METAL VALUES BY DISSOLVING THEM IN A SULFURIC ACID SOLUTION CONTAINING A CARBON SOURCE AND A REDUCING AGENT

FIELD OF THE INVENTION

The present invention relates generally to the recovery of metal values, such as tantalum and niobium compounds, from solids such as ores, ore residues, slags and other materials which include the metal values, and in particular the depleted, fluoridated solids remaining after the conventional processing of ores, concentrates or slags in hydrofluoric acid.

BACKGROUND OF THE INVENTION

There are numerous proposed schemes by which various natural ores, concentrates and slags may be processed for the recovery of metal values. One commercial scheme for the extraction and separation of tantalum and niobium (also known as columbium) values from ores, or from the widely available tin slags, is described in detail in U.S. Pat. Nos. 2,767,047, 2,953,453, 3,117,833, 3,300,297, 3,658,511, 3,712,939 and 4,164,417. In this process, feed solids are digested with hot concentrated hydrofluoric acid to solubilize most of the tantalum and niobium values as chlorides. A liquor containing the dissolved metal values is separated by filtration and treated in a multistage liquid—liquid extraction cascade wherein the metal values are extracted with methyl isobutyl ketone. The resulting filter cake from this process still contains small amounts (1–5%) of tantalum and niobium and also small amounts of natural radioactive elements such as uranium and thorium. Also retained in these solids is about 35 to 40% moisture and a small amount of residual hydrofluoric acid. Most of the metallic elements in the solids have been converted to fluorides or oxyfluorides during the initial digestion.

Generally the resulting filter cakes are stored for later processing to enable the further recovery of previously unrecovered metal values. Recovery of the remaining tantalum and niobium helps to offset the cost of treatment of these solids and also greatly reduces the amount of residual fluoride which might be undesirable in subsequent uranium recovery. Because of the variety of original ore sources and possible changes in the chemistry of the solids over time, any processing scheme must take into account the variable nature of these solids.

U.S. Pat. No. 5,023,059, the disclosure of which is hereby incorporated herein by reference, relates to a process for recovering metal values and hydrofluoric acid from the filter cake produced by ore processing.

SUMMARY OF THE INVENTION

The present invention provides a process for separation and recovery of metal values, such as tantalum and niobium compounds, from metal containing materials such as ores, ore residues and slags which include the metal values, and in particular the depleted, fluoridated solids remaining after the conventional processing of ores, concentrates or slags. In a preferred embodiment, the present invention provides a process which enables the recovery of said metal values in a sulfuric acid solution without dissolution of significant amounts of uranium from said dilute solids.

With reference to stockpiled ore residues remaining after the conventional processing of ores, it has been found that over long periods of storage (years), the uranium in the stockpiled solids tends to oxidize through contact with air, which makes it more soluble in the acid media. This dissolution of uranium would contaminate the tantalum and niobium products if not separated by other means. Another characteristic of these solids is that over the long period of storage some or all of the residual hydrofluoric acid has evaporated which has an effect on the recovery of the desired elements, tantalum and niobium and the suppression of dissolution of the uranium.

According to the present invention, a process for recovering metal values from a metal containing material comprises: digesting the metal containing material in a sulfuric acid solution in the presence of a small amount of a reducing agent and a carbon source, heating the digestion mixture and then separating the resulting solution from the remaining solids. The sulfuric acid solution may additionally include hydrofluoric acid as a source of additional fluoride ion.

The process of the present invention accomplishes long-felt objectives in the art including:

the recovery, in soluble form, as much tantalum and niobium as possible from metal containing materials, such as an ore residue, comprising tantalum and niobium, utilizing sulfuric acid as the main active agent in the dissolution, without at the same time dissolving significant percentages of uranium contained in the metal containing material; and producing metal containing material solids with improved environmental performance.

An advantage of the process of the present invention is that it utilizes sulfuric acid, which because of its stronger character can dissolve more starting metal containing materials, thus concentrating somewhat the residual radioactive elements in the undissolved solids and at the same time avoid dissolution of significant amounts of uranium.

Another advantage of the process of the present invention is that the use of sulfuric acid as opposed to hydrofluoric acid as the principal acidic media results in release of more of the tantalum and niobium from the starting metal containing material and thus gives better recovery of said metals.

A further advantage of the process of the present invention is that the metal containing material solids which are treated according to the process of the present invention have improved environmental performance.

DETAILED DESCRIPTION OF THE PROCESS

As set forth above, the present invention provides a process for recovering metal values, particularly tantalum and niobium metal values, from a metal containing material such as ore residue solids resulting from conventional ore digestion processes. The process of the present invention may be advantageously utilized to recover metal values from ore residue solids which have been stored.

According to the present invention, a process for recovering metal values from a metal containing material such as an ore, concentrate and/or slag residue resulting from the dissolution of tantalum and niobium in hydrofluoric acid comprises: digesting the metal containing material in a sulfuric acid solution in the presence of a small amount of a reducing agent and a carbon source for a period of time sufficient to solubilize the metal values, generally at least 0.5 hours, preferably 1 to 3 hours; heating the digestion mixture to a temperature of above 50° C., preferably 75–90° C. for a period of time sufficient to complete the solubilization, generally for at least 0.5 hours, preferably 0.5 to 3 hours and then separating the resulting solution from the remaining solids. The sulfuric acid solution may also include hydrofluoric acid as a source of fluoride ion.

The process of the present invention is particularly advantageous because it utilizes sulfuric acid instead of hydrofluoric acid as the principal reagent for dissolution of tantalum and niobium without also dissolving significant amounts of uranium. This greatly improves the economics of the operation, while retaining substantially all the radionucleides in the undissolved solids.

While not wishing to be bound by any theory, it is believed that the tantalum and niobium, which are initially present in the filter cake as fluorides, are dissolved while the uranium, which has undergone air oxidation is reduced to a lower state of oxidation by the iron. The presence of a small amount of free fluoride ion from the HF addition causes the uranium in the lower oxidation state to be precipitated, probably as $UF_4$. The activated carbon acts as a catalyst for the reduction process. It is theorized that hydrogen gas, formed by the reaction of iron with the sulfuric acid is adsorbed on the carbon, where it is made available in a more reactive form to cause the reduction of $U^{6+}$ to $U^{4+}$ from which state it can react with fluoride ion to form the highly insoluble $UF_4$.

The reducing environment created by the reducing agent and carbon also reduces any trace amounts of chromium and/or arsenic present in the solids.

Particular embodiments of the process of the present invention are described in more detail in the following paragraphs, and by way of the following examples.

According to an embodiment of the present invention, a process for recovering tantalum and niobium fluorides from a metal containing material comprising an ore, concentrate, slag or a mixture thereof which has been previously fluoridated by treatment with hydrofluoric acid and which comprises tantalum, niobium and radioactive metal values, including uranium comprises:

digesting the metal containing material for at least 0.5 hours, preferably for 1 to 4 hours, more preferably for about 1–2 hours at ambient temperature in a sulfuric acid solution comprising:
0.09 to 0.5, preferably 0.25 to 0.40, more preferably 0.33 pounds of concentrated sulfuric acid per pound of metal containing material solids (dry basis);
0.01 to 0.05, preferably 0.02 to 0.03, more preferably 0.02 pounds of a reducing agent per pound of metal containing material solids (dry basis);
0.01 to 0.05, preferably 0.02 to 0.03, more preferably 0.02 pounds of a carbon source per pound of metal containing material solids (dry basis) and
sufficient water to make a solution of 10 to 20%, preferably an 11 to 15%, more preferably approximately 11% sulfuric acid in water;
heating the digestion mixture to above 75° C., preferably to 80 to 90°, more preferably to 75–90° C. for at least 0.5 hour, preferably 0.5 to 1 hours, more preferably about ½ hour;
cooling the resulting mixture to below 70° C., preferably 50 to 70° C., more preferably 50–60° C.;
separating the resulting solution from the undissolved solids, preferably by filtering.

The sulfuric acid solution may additionally include 0.05 to 0.2, preferably 0.1 to 0.2, more preferably 0.12 pounds per pound of solids (dry basis) of at least 50%, preferably 70% hydrofluoric acid (HF) as a source of fluoride ion.

The separated solution (filtrate) will comprise tantalum and niobium metal values and may be further processed, for example in a solvent extraction system to concentrate and recover the tantalum and niobium by known methods, such as those described in other patents mentioned above. The separated solids may be dried by conventional means, such as co-current direct fired drying. If desired, the separated solids may be further processed to recover uranium and/or other metal values.

In a preferred embodiment, the process of the present invention further comprises the following steps after the separation step:

washing the separated undissolved solids with a volume of water equal to the volume of the resulting solution separated (the filtrate) and recycling the wash water into the sulfuric acid solution utilized in the digestion step.

The sulfuric acid solution utilized in the process of the present invention may be produced utilizing ingredients which are readily commercially available.

Suitable reducing agents include reducing metals, in particular metal compositions including iron or aluminum. The preferred form of iron is commercial forms sold as particulates of ¹⁄₁₆ to ¼ inches in size. Granulated aluminum of similar size could also perform the same function as reducing agent. Scrap metals, such as scrap iron or scrap aluminum may utilized as the reducing agent.

Suitable carbon sources include: activated carbon. The preferred form of carbon is activated carbon, such as used commercially in water treatment sold by the Calgon Company.

Preferably the following ingredient ranges are utilized in the digestion solution:

| Material | Amount Added per Pound Solids, dry basis |
|---|---|
| Sulfuric Acid (preferably 96%) | 0.09–.50 |
| Reducing Agent (preferably Iron Powder) | 0.01–0.08 |
| Carbon | 0.01–0.08 |
| HF (preferably 70%), if utilized | 0.05–0.36 |

The process of the present invention may be performed in conventional process equipment.

As will be recognized from the foregoing description, the process of the present invention may also be described as a process for treating a metal containing material comprising uranium and other metal values, e.g. tantalum and niobium, to separate the other metals values from the uranium and produce recovered metal values with lower uranium concentration. (The recovered solids will have a higher uranium concentration after processing.) Preferably, the uranium concentration of the recovered metal values is less than 5%, by weight, more preferably less than 1%, by weight.

The features and advantages of the process of the present invention are further illustrated by the following examples of certain embodiments of the invention. The following test procedures were utilized in the examples.

The amount of tantalum oxide ($Ta_2O_5$) in solution was determined by assaying the solution.

Uranium concentration was determined through the use of a fluorometric procedure in the manner known to those of ordinary skill in the art.

EXAMPLE 1

The first example compares a control process to a process of the present invention. Run A was a control process wherein filter cake (ore residue solids) from a conventional tantalum/niobium production process was digested in sulfuric acid without the addition of iron or carbon as reducing agents. Run B was a process of the present invention wherein the filter cake was digested in a solution comprising sulfuric acid, powdered iron and activated carbon.

In each run the filter cake was digested in a digestion solution, after digestion the resulting solution was heated and then the resulting solution was separated from the remaining solids by filtration. The process conditions, and digestion solution compositions, were as follows:

| Process Conditions | | |
|---|---|---|
| RUN | A | B |
| Weight of Filter Cake Sample, wet (grams) | 700 | 700 |
| Weight of Filter Cake Sample, dry (grams) | 441 | 434 |
| Amount of 96% sulfuric acid per gram of dry solids (grams) | 0.33 | 0.33 |
| Amount of Water (grams) | 922 | 895 |
| Amount of Iron Powder (grams) | 0 | 30 |
| Amount of Activated Carbon (grams) | 0 | 20 |
| Concentration of Sulfuric Acid Solution | 11 | 11 |
| Digestion Time (hours) | 1 | 1 |
| Heating Time (hours) | 0.5 | 0.5 |
| Heating Temperature, ° C. | 80 | 80 |

The resulting solution (filtrate) was analyzed utilizing the test procedures described above. The results were as follows:

| Concentration in Filtrate, g/l | Run A | Run B |
|---|---|---|
| $Ta_2O_5$ | 11.2 | 10.2 |
| Uranium | 0.509 | 0.043 |
| Volume of Filtrate, ml | 920 | 836 |

These results illustrate that the process of the present invention (Run B) successfully recovered substantially the same amount of tantalum metal values from the starting filter cake as the control process (Run A), while at the same time only dissolving minimal amounts of uranium from the starting filter cake.

EXAMPLE 2

This example also compares a control process to a process of the present invention utilizing different starting solids than utilized in Example 1. Run C was a control process wherein filter cake (ore residue solids) from a conventional tantalum/niobium production process was digested in sulfuric acid without the addition of iron or carbon as reducing agents. Run D was a process of the present invention wherein the filter cake was digested in a solution comprising sulfuric acid, powdered iron and activated carbon.

In each run the filter cake was digested in a digestion solution, after digestion the resulting solution was heated and then the resulting solution was separated from the remaining solids by filtration. The process conditions, and digestion solution compositions, were as follows:

| Process Conditions | | |
|---|---|---|
| RUN | C | D |
| Weight of Filter Cake Sample, wet (grams) | 700 | 700 |
| Weight of Filter Cake Sample, dry (grams) | 442 | 455 |
| Amount of % sulfuric acid per gram of dry solids (grams) | 0.33 | 0.33 |
| Amount of Water (grams) | 925 | 971 |
| Amount of Iron Powder (grams) | 0 | 30 |
| Amount of Activated Carbon (grams) | 0 | 20 |
| Concentration of Sulfuric Acid Solution | 11 | 11 |
| Digestion Time (hours) | 1 | 1 |
| Heating Time (hours) | 0.5 | 0.5 |
| Heating Temperature, ° C. | 80 | 80 |

The resulting solution (filtrate) was analyzed utilizing the test procedures described above. The results were as follows:

| Concentration in Filtrate, g/l | Run C | Run D |
|---|---|---|
| $Ta_2O_5$ | 14.1 | 16.1 |
| Uranium | 0.25 | 0.020 |
| Volume of Filtrate, ml | 810 | 941 |

These results illustrate that the process of the present invention (Run D) successfully recovered more tantalum metal values from the starting filter cake than the control process (Run C), while at the same time only dissolving minimal amounts of uranium from the starting filter cake.

EXAMPLE 3

This example illustrates the effect of adding a small amount of a source of fluoride ion to the sulfuric acid solution in a process of the present invention. In the above examples, there was sufficient free hydrofluoric acid in the starting samples to permit most of the uranium to beheld in the undissolved solids as a fluoride. However, due to the variable nature of the solids, this is not always the case. The following example runs shows the effect of adding a small amount of additional hydrofluoric acid to supply enough fluoride ion to combine with the uranium.

Run E was a process of the present invention wherein filter cake (ore residue solids) from a conventional tantalum/niobium production process was digested in a solution comprising sulfuric acid, powdered iron and activated carbon without the addition of hydrofluoric acid (HF). Run F was a process of the present invention wherein the filter cake was digested in a solution comprising sulfuric acid, powdered iron, activated carbon and hydrofluoric acid (HF).

In each run the filter cake was digested in a digestion solution, after digestion the resulting solution was heated and then the resulting solution was separated from the remaining solids by filtration. The process conditions, and digestion solution compositions, were as follows:

| Process Conditions | | |
|---|---|---|
| RUN | E | F |
| Weight of Filter Cake Sample, wet (grams) | 700 | 700 |
| Weight of Filter Cake Sample, dry (grams) | 446 | 447 |
| Amount of 96% sulfuric acid per gram of | 0.33 | 0.33 |

-continued

Process Conditions

| RUN | E | F |
| --- | --- | --- |
| dry solids (grams) | | |
| Amount of Water (grams) | 942 | 937 |
| Amount of Iron Powder (grams) | 10 | 10 |
| Amount of Activated Carbon (grams) | 5 | 5 |
| Amount of concentrated (70%) HF (grams) | 0 | 5 |
| Concentration of Sulfuric Acid Solution | 11 | 11 |
| Digestion Time (hours) | 1 | 1 |
| Heating Time (hours) | 0.5 | 0.5 |
| Heating Temperature, ° C. | 80 | 80 |

The resulting solution (filtrate) was analyzed utilizing the test procedures described above. The results were as follows:

| Concentration in Filtrate, g/l | Run E | Run F |
| --- | --- | --- |
| $Ta_2O_5$ | 12.12 | 9.44 |
| Uranium | 0.12 | 0.0313 |
| Volume of Filtrate, ml | 1035 | 970 |

These results illustrate the advantages of adding a small amount of hydrofluoric acid to insure that there is enough free fluoride ion to combine with the uranium.

It should be clearly understood that the forms of the present invention herein described are illustrative only and are not intended to limit the scope of the invention.

What is claimed is:

1. A process for recovering metal values including tantalum metal values and niobium metal values from a source material comprising tantalum, niobium and uranium metal values, the process comprising:
   digesting the source material in a sulfuric acid solution comprising:
      sulfuric acid;
      a reducing agent; and
      an additive comprising carbon;
   for a period of time sufficient to solubilize tantalum metal values and niobium metal values and form a digestion mixture comprising an aqueous phase comprising solubilized tantalum metal values and niobium metal values, and a solid phase comprising uranium metal values;
   heating the digestion mixture for a period of time sufficient to attain a temperature of 75–95° C.; and
   separating the resulting solution comprising tantalum metal values and niobium metal values from the remaining solids comprising uranium metal values.

2. The process of claim 1 wherein the sulfuric acid solution further comprises hydrofluoric acid.

3. The process of claim 1 wherein the reducing agent comprises iron, aluminum or mixtures thereof.

4. The process of claim 3 wherein the additive comprises activated carbon.

5. A process for separating and recovering metal values from a digestion mixture of metal containing material, including metal values to be recovered, tantalum and/or niobium metal values and one or more additional metal values, comprising:
   digesting the metal containing material in a sulfuric acid solution comprising:
      sulfuric acid;
      a reducing agent; and
      a carbon source which differs from the reducing agent;
   for a period of time sufficient to solubilize the metal values to be recovered
   heating the digestion mixture for a period of time sufficient to attain a temperature of 75–95° C.; and
   separating the resulting solution from the remaining solids;
   wherein the sulfuric acid solution further comprises hydrofluoric acid as a source of fluoride ion.

6. A process for separating and recovering metal values from a digestion mixture of metal containing material, including metal values to be recovered, tantalum and/or niobium metal values and one or more additional metal values, comprising:
   digesting the metal containing material in a sulfuric acid solution comprising:
      sulfuric acid;
      a reducing agent; and
      a carbon source which differs from the reducing agent;
   for a period of time sufficient to solubilize the metal values to be recovered;
   heating the digestion mixture for a period of time sufficient to attain a temperature of 75–95° C.; and
   separating the resulting solution from the remaining solids;
   wherein the sulfuric acid solution comprises:
      0.09 to 0.4 pounds of concentrated sulfuric acid per pound of metal containing material solids (dry basis);
      0.01 to 0.03 pounds of a reducing agent per pound of metal containing material solids (dry basis);
      0.01 to 0.03 pounds of a carbon source per pound of metal containing material solids (dry basis); and
      sufficient water to make a solution of 5 to 15% sulfuric acid in water.

7. The process of claim 6 wherein the sulfuric acid solution further comprises: 0.05 to 0.2, pounds of at least 50% hydrofluoric acid (HF) as a source of fluoride ion.

8. The process of claim 6 wherein the sulfuric acid solution comprises:
   0.33 pounds of concentrated sulfuric acid per pound of solids (dry basis);
   0.02 pounds of a reducing agent per pound of solids (dry basis);
   0.02 pounds of a carbon source per pound of solids (dry basis) and
   sufficient water to make a solution of 11% in sulfuric acid.

9. The process of claim 8 wherein the sulfuric acid solution further comprises: 0.12 pounds per pound of solids (dry basis) and 70% hydrofluoric acid (HF) as a source of fluoride ion.

10. The process of claim 6 further comprising the step of cooling the heated digestion mixture and wherein:
    the metal containing material is digested for at least 1 hour in the sulfuric acid solution;
    the digestion mixture is heated to above 75° C., for at least 0.5 hour;
    the resulting mixture is cooled to below 60° C.;
    and the resulting solution is separated by filtering.

11. The process of claim 7 further comprising the step of cooling the heated digestion mixture and wherein:
    the metal containing material is digested for at least 1 hour in the sulfuric acid solution;

the digestion mixture is heated to above 75° C., for at least 0.5 hour;

the resulting mixture is cooled to below 60° C.;

and the resulting solution is separated by filtering.

12. The process of claim 6 wherein the reducing agent is iron.

13. The process of claim 7 wherein the reducing agent is iron.

14. The process of claim 6 wherein the carbon source is activated carbon.

15. The process of claim 7 wherein the carbon source is activated carbon.

16. A process for separating and recovering metal values from a digestion mixture of metal containing material, including metal values to be recovered, tantalum and/or niobium metal values and one or more additional metal values, comprising:

digesting the metal containing material in a sulfuric acid solution comprising:

sulfuric acid;

a reducing agent; and a carbon source which differs from the reducing agent;

for a period of time sufficient to solubilize the metal values to be recovered;

heating the digestion mixture for a period of time sufficient to attain a temperature of 75–95° C.; and separating the resulting solution from the remaining solids; further comprising the following steps after the separation step:

washing the separated undissolved solids with a volume of water equal to the volume of the resulting solution separated and recycling the wash water into the sulfuric acid solution utilized in the digestion step.

* * * * *